United States Patent [19]
Schneider

[11] 4,377,323
[45] Mar. 22, 1983

[54] SPLICING DEVICE FOR PRODUCING A LIGHT WAVEGUIDE CONNECTION

[75] Inventor: Bernd Schneider, Munich, Fed. Rep. of Germany

[73] Assignee: Siemens Aktiengesellschaft, Berlin & Munich, Fed. Rep. of Germany

[21] Appl. No.: 217,163

[22] Filed: Dec. 16, 1980

[30] Foreign Application Priority Data

Dec. 20, 1979 [DE] Fed. Rep. of Germany ....... 2951483

[51] Int. Cl.³ ............................................. G02B 5/14
[52] U.S. Cl. ................................................ 350/96.21
[58] Field of Search ............. 350/96.20, 96.21, 96.22; 29/466

[56] References Cited

U.S. PATENT DOCUMENTS 4,248,499  2/1981  Liertz et al. ...................... 350/96.21

FOREIGN PATENT DOCUMENTS 2530883  1/1977  Fed. Rep. of Germany ... 350/96.21
2807806  8/1979  Fed. Rep. of Germany ... 350/96.21

*Primary Examiner*—Eli Lieberman
*Attorney, Agent, or Firm*—Hill, Van Santen, Steadman, Chiara & Simpson

[57] ABSTRACT

A splicing device for connecting light waveguides together by utilizing a splicing element having a centering groove for guiding the ends of the light waveguides therein characterized by a vertically moving support for the splicing element, a holding device at each side of the support being mounted for rotation on a horizontal axle and having a clamp for holding the end of the light waveguide at an acute angle to the base of the groove of the splicing element, each of the holding devices being mounted for movement in a horizontal plane so that the distance between the axles can be varied and an arrangement for controlling the movement of the axles of the holding device as a function of the angle of inclination of each device. The splicing device operates by the splicing element being vertically raised relative to the holding device so that the ends of the light waveguides are introduced into the centering groove and moved towards one another to be brought into mutual contact and after securing the ends together, the holding devices are rotated to coaxially align the cladding or jackets of the spliced waveguides for connecting by a bridge element.

10 Claims, 5 Drawing Figures

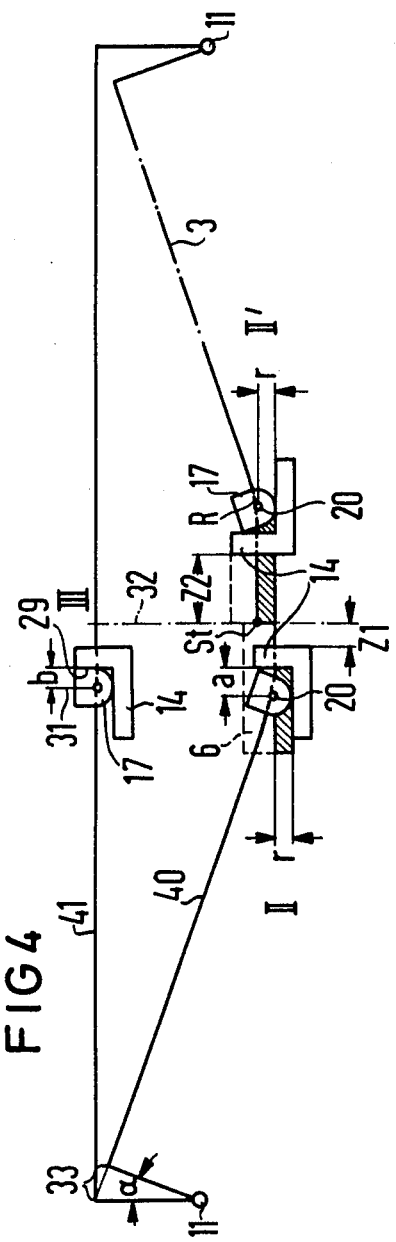
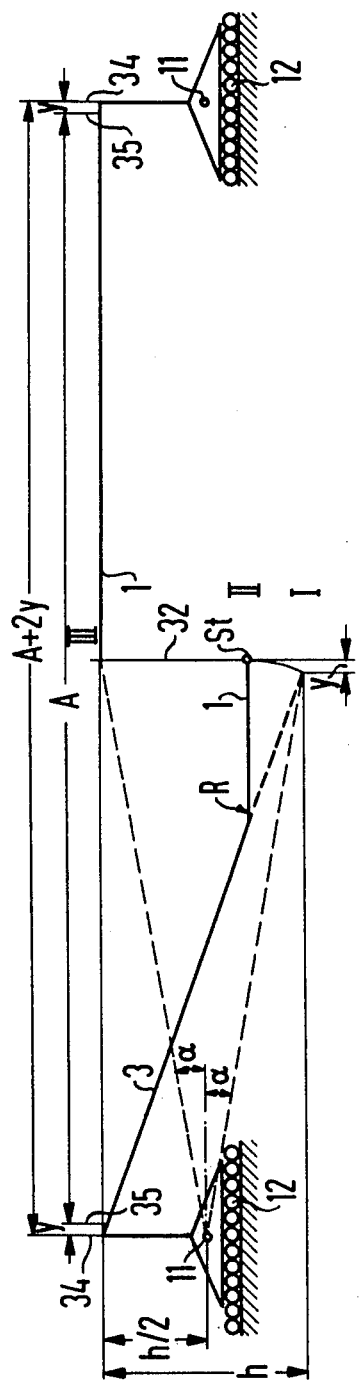

SPLICING DEVICE FOR PRODUCING A LIGHT WAVEGUIDE CONNECTION

BACKGROUND OF THE INVENTION

The present invention is directed to a splicing device for producing a light waveguide connection which utilizes a splicing element with a centering groove. The splicing device includes a vertically moveable member supporting the splicing element, and holding devices being disposed on each side of the vertically moveable element with each of the holding devices being mounted for rotation on a horizontal axle and having a clamp for holding an end of the light waveguide at an acute angle to the base of the splicing element. In operation, the ends of the light waveguides are introduced into the centering groove of the splicing element and when engaged in the groove are caused to move towards each other into coaxially aligned contact. After bonding or securing the light waveguide ends together, the holding devices are rotated as the splicing element is raised so that the cladding or jacket of the light waveguides are coaxially aligned and can be connected together either by the splicing element or by an additional splicing element to form an elongated splice unit.

A splicing device, which has a splicing element with a centering groove positioned on a vertically moveable member and has a pair of holding devices on each end of the splicing element for inserting the ends of waveguides into the centering groove and capable of rotating during part of the splicing operation so that the jackets of the waveguides are coaxially aligned with the splicing element for connection with the element or with a second additional element is disclosed in U.S. patent application Ser. No. 014,220, filed Feb. 22, 1979, which application was issued as U.S. Pat. No. 4,248,499 on Feb. 3, 1981 and includes the disclosure of German Offenlegungsschrift 28 07 806. In this known splicing device, the light waveguide ends are held at a specific angle of incidence with respect to the centering groove of the splicing element and when the splicing element is lifted up so that the free ends of the waveguides are engaged in the bottom of the centering groove, they are lifted into a horizontal plane with the ends moving towards each other until the ends of the light waveguides abut with their end faces. The length of the light waveguide, which projects out of the clamping elements of each of the holding devices, is selected so that the ends of the waveguides are coaxially aligned at least in the area of bonding or securing at the time the ends come into contact with each other. As is known, the degree of efficiency of a splice connection is very dependent upon how exactly the light waveguides are aligned before the final connection. Even a slight offset or inclination of the two axes of the light waveguide ends with respect to one another leads to a significant reduction in the degree of efficiency.

After the connection of the two light waveguide ends has been completed, the holding devices are rotated from the inclined position in order to achieve the elongated splice connection. In this position, the cladding or jacket of the two waveguide ends are connected to the splicing elements with the assistance of a bridge element which may be either a separate element or a part of the splicing element. Since the excess length of the light waveguides, which occur on the waveguides are rotated in the holding devices, would lead to a buckling of the light waveguides, the clamping elements of the light waveguides on the holding elements are first released. Since the light waveguides are loosely received in their cladding or sheaths, this excess length can be compensated by a longitudinal play of the light waveguide within its cladding or jacket. This also applies to a difference in length which occurs due to the bending of the light waveguides when inserted into the centering groove. This manner of working however, cannot be retained when the light waveguides are permanently connected to the cladding or sheath by a filling compound, because excess length arising due to the rotation of the holding device would lead to a buckling of the light waveguide.

SUMMARY OF THE INVENTION

The present invention is directed to providing an improved splicing device in which light waveguides which are permanently connected to their cladding or outer casing by a filling compound can also be spliced together.

To accomplish these goals, the improvement is in a splicing device for connecting light waveguides utilizing a splicing element having a centering groove for guiding the ends of the light waveguides therein, said splicing device having means for supporting a splicing element, a holding device being disposed on each side of the means for supporting a splicing element, each of said holding devices being mounted for rotation on horizontal axle and having means for holding an end of the light waveguide at an acute angle to the base of the groove of the splicing element, means for moving the holding device and means for supporting a splicing element relative to each other to cause introduction of the ends of the light waveguides in the splicing elements so that both ends of the individual light waveguides are moved towards one another in the centering groove of the splicing element to be brought into mutual contact and after securing of the ends together, said holding devices are rotated to coaxial align the cladding or jacket of the spliced waveguides for connecting by a bridge element. The improvements comprise means for supporting the axle of each of the holding devices for movement in a horizontal plane so that the distance between the axles can be varied and control means for controlling the movement of the axles of the holding devices as a function of the angle of inclination of each holding device.

Preferably, the axle or fulcrum of the holding device are displaceable towards or respectively away from one another with the assistance of a ball bearing support. In this manner, the possibility exists that the excess length of the waveguide which occurs during the upward rotation can be completely compensated. A particular simple solution of the problem is obtained by the providing of a control means which includes a cam link for each of the holding devices, means supporting the cam links adjacent the means for supporting a splicing element and an arm secured to each holding device having a cam follower engaged with the respective cam link. By so doing, the control of the spacing between the axles of the rotatable holding devices will occur.

Preferably, the cam links are adjustably mounted on the means for supporting the cam links which may be a vertically movable member so that the distance between the cam links is changeable, the arms supporting each of the cam followers are adjustably mounted on the holding device to enable changing the distance of the cam follower from the axle of the holding device and the cam follower which has an irregular surface is rotatably mounted on a fulcrum of the arm which fulcrum lies on the axis of the light waveguide so that the axis of the cam follower can be angularly adjusted relative to the axis of the arm. These adjustments enable the following changes due to the interaction of the cam link with the cam follower.

(a) The lengths of the ends of the light waveguides with respect to the point of the abutment therebetween can be set in such a manner that the end surfaces of the light waveguide strike each other at the joint with a slight prestress and this condition is easily obtained with repetition.

(b) The arc with which the ends of the light waveguides enter into the splicing element can be adjusted by means of setting the angular position of the cam follower of each holding device and the distance between the cam links in such a manner that a specific prestress is achieved with which the end of the light waveguides are pressed against each other in the bottom of the grooves.

(c) The differential length occurring due to the arc of the ends of the light waveguides can be compensated by means of turning or changing the angular position of the cam follower on each arm. Thus, it is also possible to set a slight excess length of the light waveguides in the upper final position of the holding device in order to guarantee that the light waveguides will not be subjected to tensile stresses and will not be pulled apart at the splicing location.

BRIEF DESCRIPTION OF THE DRAWINGS

FIG. 4 is a graphical illustration illustrating the operation of the adjustable cam follower; and FIG. 5 is a graphical illustration illustrating the changes in the distances occurring during the operation of the device in accordance with the present invention.

DESCRIPTION OF THE PREFERRED EMBODIMENTS

Figure 1:
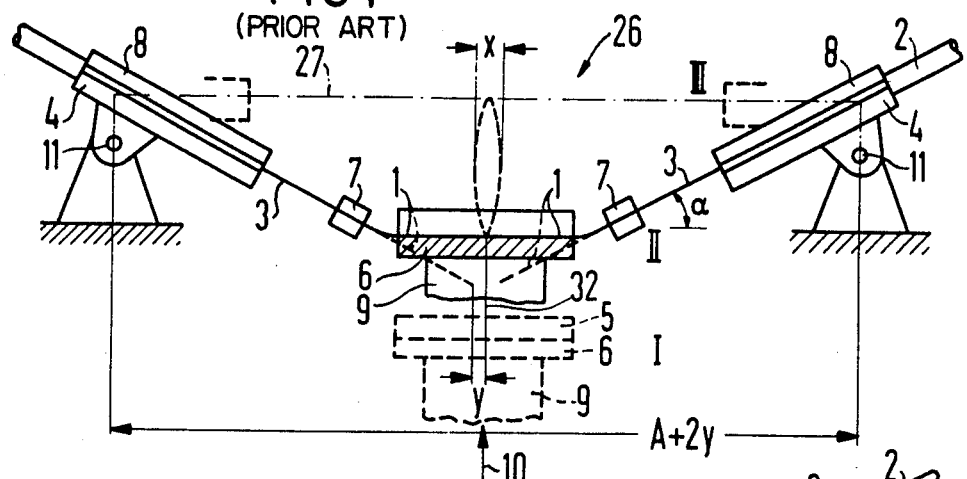
FIG. 1 is a diagrammatical view of a splicing device in accordance with the prior art.
Figure 2:
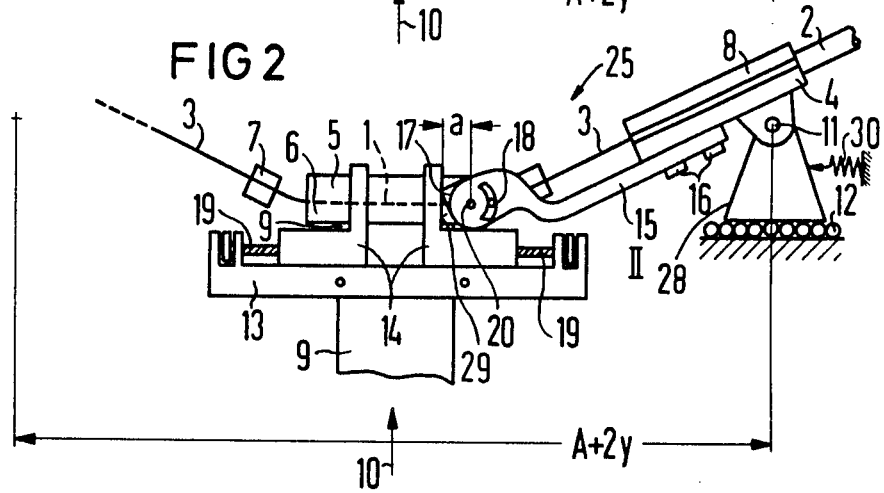
FIG. 2 is a diagrammatical view of the improved splicing device in accordance with the present invention as illustrated during a second phase of the operation.
Figure 3:
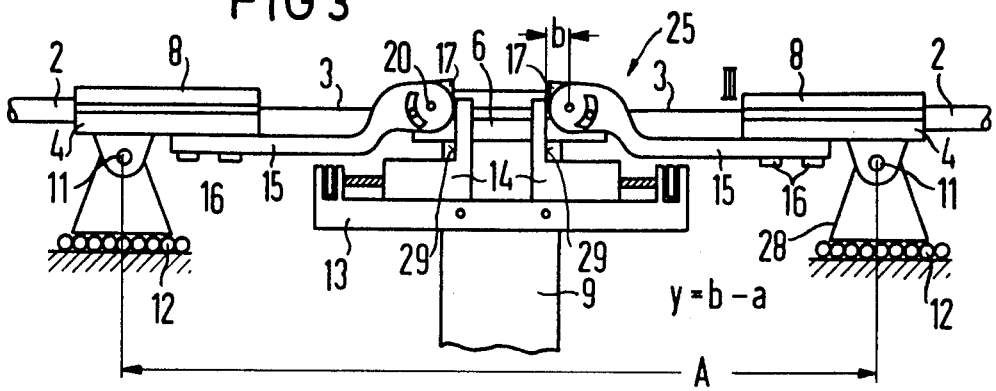
FIG. 3 is a diagrammatical view of the improved splicing device in accordance with the present invention at the end of a splicing operation.

The principles of the present invention are particularly useful when incorporated in a splicing device generally indicated in 25 in FIGS. 2 and 3. The splicing device 25 is an improvement on a known existing splicing device generally indicated at 26 in FIG. 1. It should be noted that similar elements in both the device 25 and 26 are provided with the same element numbers.

In the device 26, the holding devices 4, which rotate on axles 11, are arranged on each side of a vertically moveable member 9 which supports a splicing element 6 having a centering groove 5. As illustrated the vertically moveable member 9 provides means for moving the splicing element 6 from a beginning position I illustrated in broken lines to an intermediate position II shown in solid lines and up to a final or ending position III with the bottom of the groove 5 being in a horizontal plane indicated by the chain line 27.

Each of the holding members 4 has clamping means or elements 8 for engaging the jacket or cladding 2 of a light waveguide 3 whose free end 1 is held in an angle of inclination α. The free end 1 of the waveguide 3 is stripped of its cladding or jacket 2 and is gripped by a clamping element 7 which may be a stationary clamping element or connected to the holding device 4 and rotatable therewith.

While the device 26 of FIG. 1 is illustrated as holding a pair of waveguides 3,3, it can be used to splice a plurality of light waveguides simultaneously. In such a case the waveguides are held in a plane extending perpendicular to the paper.

In the operation of the device 26, the initial position I has the vertically moveable means 9 which supports the splicing elements 6 in the lower position illustrated in broken lines. In this arrangement, the free end 1 of each of the waveguides 3 extend down at the angle α towards the open centering groove 5 of the splicing element with the ends being spaced apart a distance $2y$. As the vertically moveable member 9 is raised in the direction of arrow 10 towards the position 2, the end faces of the free ends 1 of the light waveguides 3 will engage the bottom of the groove 5 and be moved towards each other until their end faces abut. In this position which is illustrated at the position II, the ends 1 of the light waveguides are provided with an immersion bonding agent and may be subsequently clamped with a counter piece or member which is not illustrated. Subsequent to securing the abutting end faces together, the clamping element 7 is released from engagement with each of the waveguides 3 and the holding devices 4 are rotated towards the horizontal position which is indicated by III as the splicing element 6 is continually raised in the vertical direction 10. When the position III is obtained, the splicing element 6 may be connected by an additional bridging element to the cladding or jackets 2 of the two waveguides to form an elongated spliced unit. The excess length x, which occurs during the additional upward motion from the position II to the position III as the ends of the waveguides try to follow the path of the broken lines and which would cause a buckling of the light waveguide 3, is compensated by a longitudinal play of the waveguides 3 in their loosely held jackets 2. This compensation also occurs for the difference in the length $2y$ between the positions I and III which arise due to the insertion of the ends 1 of the light waveguides into the centering groove 5 of the splicing element 6.

In order to be able to form a splice between light waveguides which are rigidly connected to their cladding or jackets by a filling compound, the spacing between the fulcrums or axles 11 of the holding devices must be free to vary.

The splicing device 25 of FIG. 2 has the improvement in which the axles 11 of each of the holding devices 4 are arranged on members 28 which can move in a horizontal plane due to the assistance of ball bearing support structure or linear bearing 12. In addition, this movement in the plane is controlled by a control means, which includes cam links 14 which are mounted on a vertically moveable member or support 13 and have a surface engaged by a cam follower 17, which is rotatably mounted on a fulcrum or axle 20 of an arm 15 which is adjustably secured to the holding device 4 by screws 16. Due to the adjustable position of the arm 15, the distance of the follower 17 from the axle 11 can be adjusted. In addition, the angular relation of the cam follower 17 on the arm 15 can be rotatably adjusted on the fulcrum by member 18. The position of the fulcrum 20 on the arm 15 is selected so that it is displaceable in the direction of the axis of the light waveguides. It should also be noted that each of the cam links 14 are mounted on the member 13 by a threaded screw 19 which enables changing the distance therebetween.

As illustrated in FIG. 2, the device 25 is in the position II at which the ends of the waveguides 1 have their end faces in abutting relation while received in the groove 5 of the splicing element 6. As the carrier 9 is lifted the cam follower 17 is pressed against the cam surface 29 of the cam line 14 by biasing means illustrated as the spring 30. Thus, the excess length x, which occurs in the waveguide as the holding devices 4 are rotated from the position II to the position III are compensated due to movement of the support 28 of the axle 11 on the roller bearing structure 12.

When the holding devices 4 have reached the position III as illustrated in FIG. 3, the ends 1 and the cladding or jackets 2 of the light waveguides 3 lie in a horizontal plane. After releasing the clamping elements 8, the splice element 6 and the cladding or jackets 2 of the light waveguides can be connected with each other by a bridge element to form the elongated spliced or structural unit. The bridge elements are described in greater detail in an earlier German patent application No. P 29 30 831.4.

It should be noted that the cam links 14 which are adjustably mounted on the vertically moveable member 13 will move upward in the direction 10 as the holding devices 4 are rotated about their axles 11. The movement of the member 13 may be by a separate member not illustrated or due to a loss motion connection between the member 13 and the vertically moveable member 9 so that the member 13 will start moving after the splicing element 6 is elevated about the position II of FIG. 2.

As best illustrated in FIG. 4, the cam follower 17 has an irregular surface which has a major axis 31 which can be adjusted to different angular positions relative to the longitudinal axis of the arm 15 (FIG. 3) by rotating the follower 17 on the axle or fulcrum 20 and locking it in a fixed position by the adjustment catch 18. If the major axis 31 of the follower 17 extends perpendicular to the arm which is indicated schematically by the line 40, and the cam link 14 is maintained at a position or spacing Z1 from a center line 32, then as the arm 40 rotates through the angle α on the axle 11 and the distance from the fulcrum 20 of the follower 17 to the position 33 is constant, the axle 11 will move toward the center line 32 when the arm assumes the position indicated by the line 41. This change of the distance of axle 11 from the center line 32 is equal to the distance a−b wherein the distance a is the distance of the fulcrum 20 from the cam surface 29 of the cam link 14 when the cam link is in the position II and the distance b is the distance between the fulcrum 20 and the surface 29 when the cam link 14 has assumed the position III. By changing the angular position of the follower 17 on the arm 15, the distance a and b can be changed or adjusted. It also should be noted that the line 40 which is in the longitudinal axis of the arm 15 while in the position II also is the axis of the waveguide 3 at this position.

As schematically illustrated in FIG. 5, the distance y is the horizontal distance of the end of the waveguide 3 from a center line 32 when the waveguide is in the initial position I. As the end of the waveguide is raised and travels through an arc with the radius R, the end faces meet at the joint St on the center line 32. If the distance between the axles 11 is the distance A+2y as illustrated in FIG. 5, during the initial position I and through the initial position II, then the end faces do meet at the joint St. Continual movement of the waveguide 3 from the inclined angle α to a horizontal position as illustrated by the portion 1 in FIG. 5 would cause an increase in the length which might cause buckling. Thus, this buckling force is relieved by movement of the axle 11 on the roller bearing structure 12. As the waveguide is elevated from the position II towards the position III, and the holders 4 are allowed to rotate on the axles 11, the distance between the axles 11 must be reduced to an interval A (FIG. 5) in order to compensate for the rotation or shifting of the waveguide 3 as it rotates about the axle 11. Thus, the axle shifts from a line 34 where the distance between the two axles 11 is A+2y to a position on line 35 wherein the distance is only A. If the positions of each of the axles 11 were held fixed, the rotation about the axle could cause a tension force to be applied to the joint St to pull it apart as the waveguides reach the position III.

The coaction of the control means which is formed by the link 14 plus the arm 15 and the rotatable stop 17, controls the displacement of the axle 11 of each of the holding devices 4. This ensures that the axle shifts to prevent any buckling during the raise from the position II to the position III and also shifts to prevent applying any undesirable tension forces to the joint.

By rotating the follower 17 on its fulcrum 20, the amount of the spacing a while the device is in the position II and the spacing b while the device is in the position III, can be varied. Also, by changing the spacing between the cam links 14 from a spacing such as Z1 to a spacing Z2 (FIG. 4) different changes in the control means are attainable. The adjustable mounting of the arm 15 on the holding device 4 also enables a third adjustment. By selecting these various positions for the link 14, the angular position of the follower 17 on the arm 15 and the length of the arm 15, it is possible that the length differences a−b can be approximately equal to the distance y so that the end faces are not subject to any tension or compression. If desired, the settings may be arranged so that the two end faces of the waveguides as the reach the position III are under a slight compressive force to guarantee that the connection between the two end faces does not become subjected to any tensile strain or force, which might possibly pull the abutted faces apart.

Although various minor modifications may be suggested by those versed in the art, it should be understood that I wish to embody within the scope of the patent granted hereon, all such modifications as reasonably and properly come within the scope of my contribution to the art.

I claim:

1. In a splicing device for connecting light waveguides together utilizing a splicing element having a centering groove for guiding the ends of the light waveguides therein, said splicing device having means for supporting a splicing element, a holding device being disposed on each side of the means for supporting a splicing element, each of said holding devices being mounted for rotation on a horizontal axle and having means for holding an end of a light waveguide at an acute angle to the base of the splicing element, and means for moving the holding device and the means for supporting a splicing element relative to each other to cause introduction of the ends of the light waveguides in the splicing elements so that both ends of the individual light waveguides are moved towards one another in the centering groove of the splicing element to be brought into mutual contact and after securing of the ends together, said holding devices being rotated to coaxially align the cladding of the spliced waveguides for connecting by a bridge element, the improvements comprising means supporting the axle of each of the holding devices for movement in a horizontal plane so that the distance between the axles can be varied and control means for controlling the movement of the axles of the holding device as a function of the angle of inclination of each holding device.

2. In a splicing device according to claim 1, wherein the means for supporting each of the axle includes a ball bearing support.

3. In a splicing device according to claim 2, wherein the control means includes a cam link for each of the holding devices, means supporting the cam links adjacent the means for supporting a splicing element and an arm secured to each holding device having a cam follower engaged with the respective cam link.

4. In a splicing device according to claim 3, wherein the arm for the cam follower is adjustably mounted on the holding device so that the distance of the cam follower from the axle can be adjusted.

5. A splicing device according to claim 3, wherein the cam follower is rotatably mounted on a fulcrum which lies on the axis of the light waveguide supported by the holding device.

6. A splicing device according to claim 3, wherein the cam links are adjustably mounted on means for supporting the cam links so that the cam links are adjusted relative to each other.

7. A splicing device according to claim 1, wherein the control means includes a cam link for each of the holding devices being mounted on a vertically movable member adjacent the means for supporting the splicing element, a cam follower for each cam link being mounted on an arm attached to the holding device for rotation therewith.

8. A splicing device according to claim 7, wherein the arm of each of the cam followers is adjustably mounted on the holding device to enable changing the distance of the cam follower from the axle of the holding device.

9. In a splicing device according to claim 7, wherein the cam follower is rotatably mounted on said arm on a fulcrum which lies on an axis of the light waveguide so that the axis of the cam follower can be angularly adjusted relative to the axis of the arm.

10. In a splicing device according to claim 7, wherein each of the cam links are adjustably mounted on said vertical movable member so that the distance therebetween can be adjusted.

* * * * *